United States Patent [19]

Millgard et al.

[11] Patent Number: 5,135,058
[45] Date of Patent: Aug. 4, 1992

[54] CRANE-MOUNTED DRILL AND METHOD FOR IN-SITU TREATMENT OF CONTAMINATED SOIL

[75] Inventors: V. Dennis Millgard, Orchard Lake; Roger H. Kappler, Manchester, both of Mich.

[73] Assignee: Millgard Environmental Corporation, Livonia, Mich.

[21] Appl. No.: 514,404

[22] Filed: Apr. 26, 1990

[51] Int. Cl.$^5$ .......................... E02D 3/12; E21B 10/60
[52] U.S. Cl. ........................... 175/71; 175/21; 175/424; 405/269; 366/169
[58] Field of Search ............... 175/17, 19, 21, 25, 175/50, 57, 71, 392, 393, 424; 405/128-131, 258, 263, 266, 269, 240, 241, 267; 210/747, 739, 170; 366/102, 65, 348, 344, 169

[56] References Cited

U.S. PATENT DOCUMENTS

| | | |
|---|---|---|
| 935,081 | 9/1909 | Wolfsholz . |
| 2,196,211 | 4/1940 | Hartman . |
| 2,450,223 | 9/1948 | Barbour . |
| 2,782,605 | 2/1957 | Wertz et al. . |
| 3,023,585 | 3/1962 | Liver . |
| 3,232,361 | 2/1966 | Haspert ........................... 175/102 |
| 3,774,701 | 11/1973 | Weaver ............................. 175/71 |
| 4,000,621 | 1/1977 | Maser . |
| 4,028,240 | 6/1977 | Manchak, Jr. ................... 210/59 |
| 4,079,003 | 3/1978 | Manchak ........................ 210/46 |
| 4,184,958 | 1/1980 | Manchak, Jr. .................. 210/170 |
| 4,332,301 | 6/1982 | Jonell ............................. 175/50 |
| 4,489,793 | 12/1984 | Boren ............................. 175/71 |
| 4,606,675 | 8/1986 | Mitani et al. ................... 405/263 |
| 4,776,409 | 10/1988 | Manchak, Jr. .................. 175/50 |
| 4,792,237 | 12/1988 | Hara ............................... 175/19 |
| 4,809,790 | 3/1989 | Manchak, Jr. .................. 175/17 |
| 4,818,390 | 4/1989 | Manchak, Jr. .................. 210/170 |
| 4,834,194 | 5/1989 | Manchak, Jr. .................. 175/50 |
| 4,839,061 | 6/1989 | Manchak, Jr. et al. ......... 210/743 |
| 4,844,807 | 7/1989 | Manchak, Jr. .................. 210/682 |
| 4,844,839 | 7/1989 | Manchak, Jr. .................. 252/633 |
| 4,886,400 | 12/1989 | Taki et al. ...................... 405/267 |
| 4,902,172 | 2/1990 | Fukuda .......................... 405/263 |
| 4,958,962 | 9/1990 | Schellhorn ..................... 405/267 |
| 5,006,016 | 4/1991 | Fukuda .......................... 405/240 |

FOREIGN PATENT DOCUMENTS

154219  9/1984  Japan .
2157343  10/1985  United Kingdom .

*Primary Examiner*—David J. Bagnell
*Attorney, Agent, or Firm*—Barnes, Kisselle, Raisch, Choate, Whittemore & Hulbert

[57] ABSTRACT

Apparatus for in-situ treatment of contaminated soil that includes an elongated hollow drive shaft mounted for rotation about its axis while being supported in vertical orientation. The upper end of the drive shaft is connected for selective injection of fluid under pressure into the shaft. A drill is affixed to the lower end of the shaft for drilling a hole downwardly through the soil. The drill comprises a hollow sleeve mounted to the lower end of the shaft and extending therefrom coaxially with the shaft. A pair of drill blades are cantilevered from the sleeve, and extend outwardly therefrom at right angles diametrically opposite to and aligned with each other. Each blade is of identical uniform cross section and carries a plurality of radially spaced drill teeth oriented tangentially of the sleeve along a leading radial edge of the blade. A hollow pipe extends along the trailing edge of each blade, and has orifices for injecting fluid from the sleeve and the pipe into the earth as the blade is rotated. A plate is affixed to each blade to deflect soil away from the nozzle orifices as the drill is rotated. A sensor is responsive to velocity of the drive shaft and drill, and cooperates with control electronics for injecting fluid into the earth as a predetermined function of velocity of the shaft.

30 Claims, 5 Drawing Sheets

CRANE-MOUNTED DRILL AND METHOD FOR IN-SITU TREATMENT OF CONTAMINATED SOIL

The present invention is directed to improvements in drill apparatus and methods for in-situ fluid treatment of contaminated soils.

BACKGROUND AND OBJECTS OF THE INVENTION

Soil contamination from waste impoundments or ponds, leakage of buried waste, or dumping of waste directly onto the ground, has heretofore been recognized as a serious problem both in this country and abroad. Many techniques have been proposed for addressing this problem, ranging from removal of contaminated soil for redisposal or treatment, to in-situ treatment by chemical reaction in an effort to neutralize contaminants or encase the contaminated soil in solid concrete or the like. One particular method for in-situ treatment of contaminated soil heretofore proposed in the art involves driving one or more augers into the earth while simultaneously injecting treatment fluid through nozzles in or associated with the auger drill bits. The auger is carried by apparatus suitable for movement between successive drill positions, so that holes are drilled and soil is treated in a pattern that ultimately includes an entire contaminated field. While this technique and theory have the significant advantages of economy, and of not requiring removal of contaminated soil, with consequent danger of dispersing gaseous contaminants and dust, these theoretical advantages have not heretofore been realized in fact.

One disadvantage of auger-type devices heretofore proposed lies in the small surface area and depth that can be treated in a single drilling operation. In an effort to increase coverage area and treatment efficiency, it has been proposed to provide multiple parallel augers rotated in an interlocking pattern. However, such multiple-auger systems still only cover a surface area of up to about thirty square feet in each penetration, and typically have a maximum penetration depth of about thirty-five feet. Furthermore, a rock or other obstruction can become wedged between the auger blades, locking the drill system and causing significant downtime for removal and repair.

It is therefore a general object of the present invention to provide an apparatus and method for contaminated soil treatment that obtain the advantages of auger-type techniques heretofore theorized but not in fact obtained in the art. A more specific object of the invention is to provide an apparatus and method of the described character that are capable of enhanced depth of soil penetration as compared with techniques heretofore proposed, that cover greater surface area on each drilling operation, and that thus may be operated more efficiently than techniques heretofore proposed. Another and related object of the invention is to provide a single-bit apparatus of the described character in which the drill bit is driven with enhanced power as compared with prior art devices, thereby enabling both greater surface area coverage and greater depth of soil penetration. A further object of the present invention is to provide an apparatus and method that are adapted for enhanced control of fluid injection for soil treatment for obtaining greater drilling speed, increased treatment efficiency and more efficient treatment control than prior art techniques of a similar character.

SUMMARY OF THE INVENTION

Apparatus for in-situ treatment of contaminated soil in accordance with the present invention includes an elongated hollow drive shaft supported in vertical orientation and rotated about its vertical axis. A fluid pump is coupled by a suitable hose and swivel to the upper end of the drive shaft for selectively injecting fluid under pressure into the shaft. A drill bit is affixed to the lower end of the drive shaft for drilling a hole downwardly through the soil. In the preferred embodiment of the invention, the drive shaft comprises a Kelly bar vertically suspended from the boom of a crawler crane. A drilling attachment or the like is carried by the boom for driving the Kelly bar.

In accordance with a first important aspect of the present invention, the drill bit comprises a hollow sleeve mounted to the lower end of the drive shaft and extending coaxially therefrom. A pair of drill blades are cantilevered from the sleeve and extend outwardly therefrom diametrically opposite each other. The blades are of identical uniform cross section and length. A plurality of radially spaced drill teeth are oriented tangentially of the sleeve along the front edge of each blade, with the teeth being angulated downwardly with respect to the sleeve axis. A hollow pipe or conduit extends along the back edge of each blade, with each pipe opening into the drill sleeve for receiving fluid under pressure fed thereto from the drive shaft. A plurality of nozzles on each pipe open tangentially of the sleeve oppositely of the teeth. In the preferred embodiment of the invention, the nozzles comprise orifices in the sidewall of the pipe at non-uniform spacing that decreases radially outwardly of the sleeve. The orifices open rearwardly and upwardly at an angle to the plane of the blades. A deflector is affixed to the upper surface of each blade and deflects soil from entering the orifices during rotation of the drill bit.

In accordance with a second important aspect of the present invention, the fluid supply mechanism includes a sensor coupled to the drive shaft for providing an electrical signal as a function of velocity of the shaft, and consequently as a function of velocity of the drill bit. An electronic controller is responsive to such velocity signal for providing a corresponding control signal to a fluid control valve, so as to control injection of fluid into the drive shaft to the drill bit, as a predetermined function of velocity of the shaft. In this way, rate of fluid injection through the drill bit is controlled as a function of drill velocity so as to achieve substantially uniform fluid injection per unit volume of drilled soil. The sensor may be responsive to axial or angular velocity of the drive shaft, or to both axial and angular velocities for controlling fluid injection as a combined function of such velocities. Preferably, the fluid control system also includes facility for operator variation of the fluid control function. Most preferably, the fluid control system further includes one or more sensors responsive to preselected characteristics of the fluid itself, such as temperature, pressure and/or fluid flow rate, for enhanced control of the fluid injection operation.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
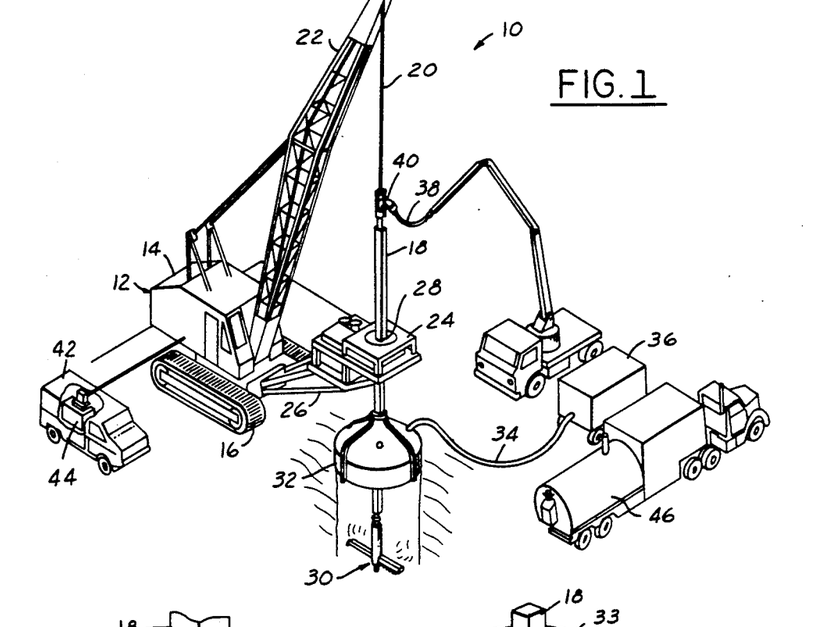
FIG. 1 is a perspective diagram of apparatus for in-situ treatment of contaminated soil in accordance with a presently preferred embodiment of the invention.
Figures 2, 3:
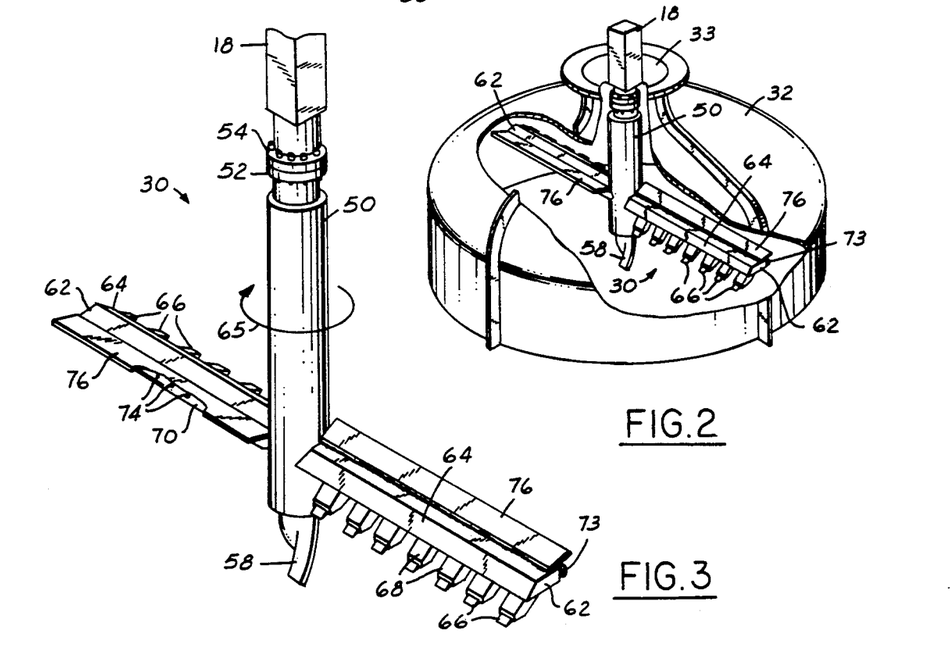
FIG. 2 is a fragmentary perspective view of a portion of the apparatus of FIG. 1 on an enlarged scale.
FIG. 3 is a fragmentary perspective view of a portion of the apparatus in FIGS. 1 and 2 on an additionally enlarged scale.

FIG. 1 illustrates apparatus 10 in accordance with a presently preferred embodiment of the invention as comprising a crane 12 having a cabin 14 carried by a pair of tracks 16. A hollow Kelly bar 18 is suspended by a cable 20 from the upper end of a boom 22, which is pivotally mounted at its lower end to the crane frame. A drilling attachment 24 is mounted on crane 12 by a support frame 26, and has a drive 28 that encompasses Kelly bar 18. A drill bit 30 is affixed to the lower end of Kelly bar 18. A shroud 32 has a rotatable gland 33 that sealingly embraces Kelly bar 18, and has an open lower edge adapted to rest on the ground surface as the Kelly bar and drill bit move axially with respect thereto. Shroud 32 is connected by suitable hoses 34 to a system 36 for purification or entrapment of volatiles released into shroud 32 during drill penetration of soil under treatment. A hose 38 is connected by a swivel 40 to the upper end of Kelly bar 18 at cable 20 for feeding fluid under pressure to the interior of the Kelly bar. A van 42 houses an operator station 44 for electronically controlling operation of apparatus 10. A boiler 46 is coupled to hose 38.

Drill bit 30 is illustrated in greater detail in FIGS. 2-6 as comprising a hollow cylindrical sleeve 50 having a flange 52 at its open upper end for connection to a corresponding flange 54 at the lower end of Kelly bar 18. A passage 56 (FIG. 4) at the open upper end of sleeve admits fluid from the interior of Kelly bar 18 to the interior of sleeve 50. A pair of angulated drill teeth 58 extend axially outwardly from a plug 60 that closes the lower end of sleeve 50. A pair of drill blades 62 are affixed to sleeve 50 and extend radially outwardly therefrom diametrically opposite each other. Each blade 62 comprises a solid rectangular bar of steel or other suitable metal stock welded at its inner end to the external surface of sleeve 50, and having its outer end cantilevered therefrom. The major central planes of blades 62 are coplanar and perpendicular to the axis of sleeve 50. One edge of each blade 62—i.e., the forward edge 64 with respect to the direction 65 (FIGS. 3 and 4) of drilling rotation of the drill bit—is sloped or tapered at an upward and rearward angle. This facilitates movement of the blades through the soil. An array of uniformly radially spaced teeth 66 extend along forward edge 64 of each blade 62. Each drill tooth 66 is removably received in a suitable pocket 68 affixed to the lower front edge of each blade 62. The angles of teeth 66 and surface 64 with respect to the axis of sleeve 50 is selected as a function of the firmness of soil being penetrated. This angle may vary between 10° to 30°, with an angle of about 20° being preferred as shown in the drawings for typical soil densities and compositions.

Figure 4:
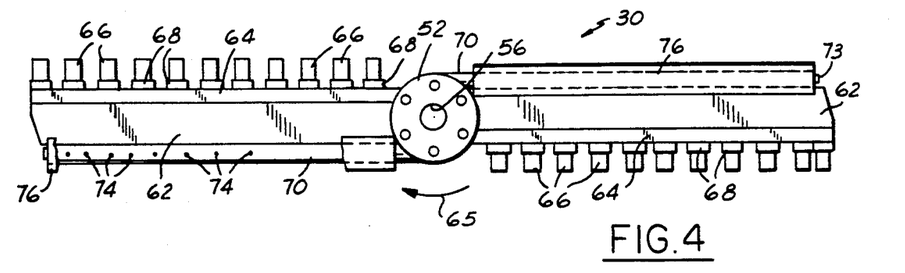
FIG. 4 is a top plan view of the drill bit in the apparatus of FIGS. 1-3.
Figure 5:
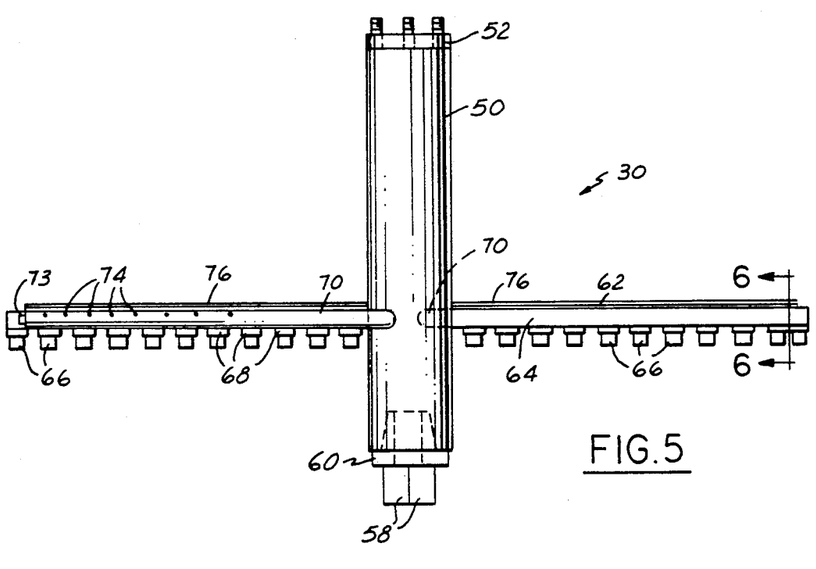
FIG. 5 is a side elevational view of the drill bit illustrated in FIG. 4.
Figure 6:
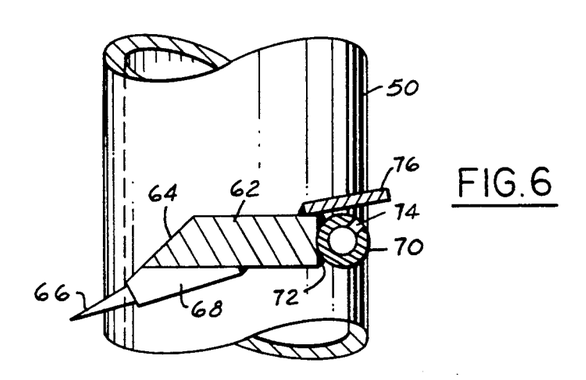
FIG. 6 is a fragmentary sectional of view taken substantially along the line 6—6 in FIG. 5.

A hollow pipe 70 is affixed to the tangentially facing trailing edge 72 of each blade 62. Each pipe 70 has a plug 73 at its outer end, and opens at its inner end to the interior of sleeve 50 so as to receive fluid fed to sleeve 50 through Kelly bar 18. A plurality of nozzles 74 are provided in a radially spaced array along the back edge of each pipe 70. In the preferred embodiment of the invention illustrated in the drawings, nozzles 74 comprise openings or orifices that extend through the sidewall of pipe 70, and open at an upward and rearward angle with respect to the plane of blades 62. Nozzle orifices 74 are of non-uniform spacing radially of sleeve 50, as shown in FIGS. 4 and 5, with the inter-orifice spacing being greatest adjacent to the sleeve and decreasing radially outwardly of the sleeve. An elongated plate 76 is welded or otherwise affixed to the upper surface of each blade 62 and extends tangentially rearwardly over the associated pipe 70, covering pipes 70 and orifices 74 when viewed from the axial direction (FIG. 4). Plates 76 deflect soil over orifices 74 so as not to penetrate or clog the orifices. Blades 62, including teeth 66, deflector 76 and pipes 70, are identical to each other. Size of orifices 74 depends upon density of material to be pumped. For example, for air or steam, a relatively small orifice on the order of three-eighths inch diameter would be suitable. For materials of medium density such as grout, an orifice size of three-quarters inch would be suitable. For relatively dense materials such as slurries of sand or cement, a larger orifice on the order of one inch to one and one-quarter inch may be suitable. In a working embodiment of the invention illustrated in FIGS. 4-6 and having a ten-foot diameter between the blade tips, orifice 74 comprise three-quarter inch holes at an angle of 45°.

In operation, to the extent thus far described, shroud 32 is first placed onto the earth surface with drill bit 30 positioned therewithin. System 36 is actuated to entrap and/or purify any gases that escape from the soil during drilling. Kelly bar 18 and drill 30 are then rotated in direction 65 by drive 24. When drill teeth 66 are brought into engagement with the earth surface, continued driving of the drill combines with angle of attack of teeth 66 to propel the drill inwardly or downwardly into the earth's surface. Indeed, it has been found that the design of the drill bit, coupled with power of drive 14, is so efficient that driving of the drill into the earth must actually be retarded in many cases by applying tension to cable 20 to obtain proper mixing and penetrating of the soil. During rotation, deflector 76 functions to shield nozzle orifices 74 from dirt flowing over the upper surface of blades 62. While bit 30 is rotating during drilling into and/or removal from the earth, fluid under pressure is fed to Kelly bar 18 by fluid control system 80 to be described in conjunction with FIGS. 7 and 8. Fluid treatment media may comprise:

hot air or steam to drive off volatile organic compounds that are collected by shroud 32 and fed to system 36; microbes, hydrogen peroxide or a phosphorous/nitrogen solution for bioreclamation for creosote-contaminated and hydrocarbon-contaminated soil; cement, flyash or silicaceous material to solidify and entomb heavy metals; or a neutralizing agent to stabilize pond sludge.

Figure 7:
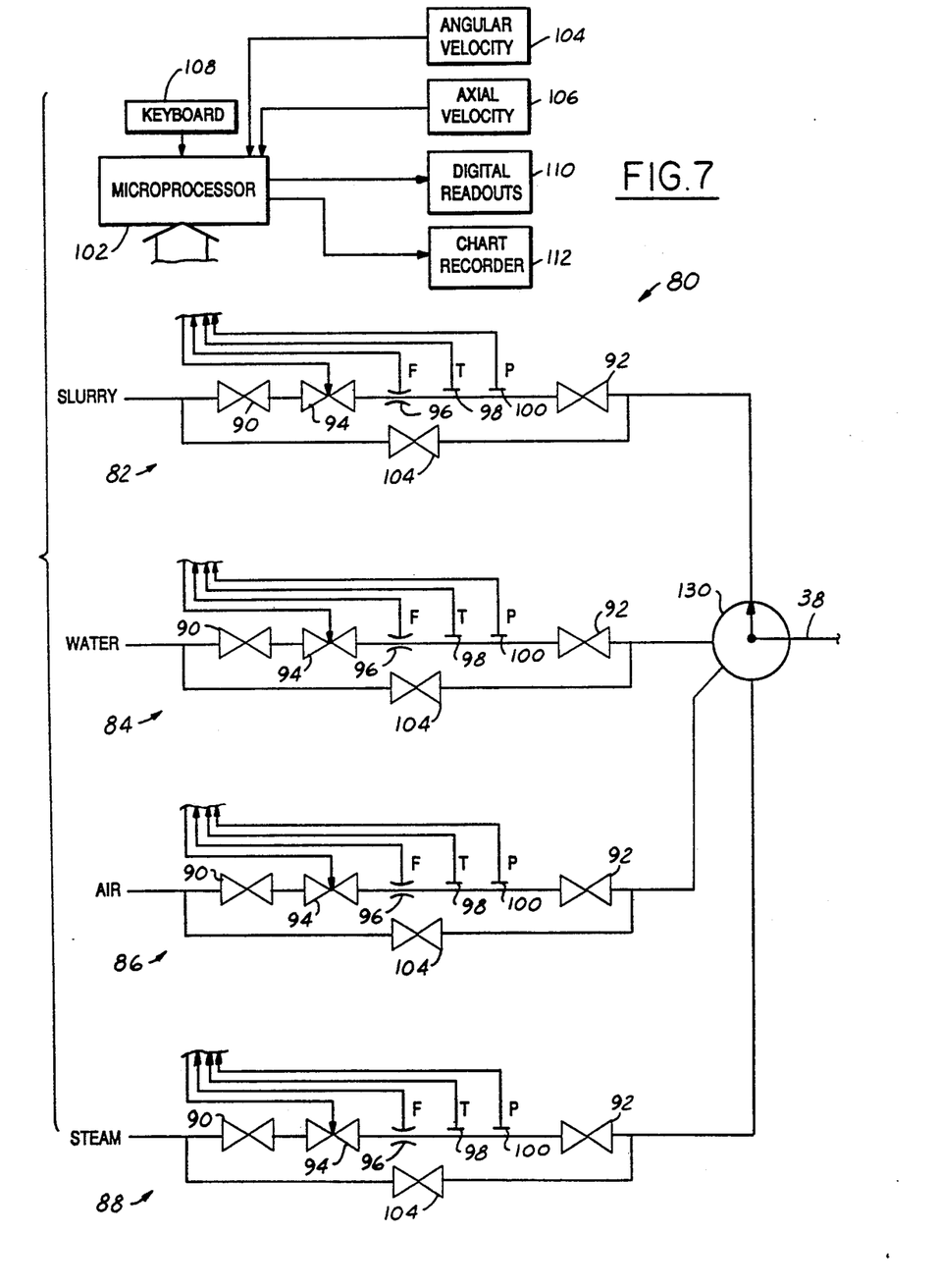
FIG. 7 is a schematic diagram of the fluid injection control system of the present invention.

Fluid control system 80 comprises four control lines 82,84,86,88 for feeding a slurry, such as a cement/flyash/water (grout) slurry, water, compressed air and steam respectively between corresponding sources and Kelly bar 18. Slurry line 82 includes a pair of valves 90,92 connected to the slurry source and to Kelly bar 18 respectively. Between valves 90,92, there are connected in series an electrically operated proportional flow control valve 94 such as a solenoid valve, a flow sensor 96, a temperature sensor 98 and a pressure sensor 100. Control valve 94 is responsive to electrical control signals from a microprocessor 102 for selectively feeding fluid from the slurry source to Kelly bar 18. Flow sensor 96, temperature sensor 98 and pressure sensor 100 provide corresponding electrical signals to microprocessor 102 as a function of fluid flow rate, fluid temperature and fluid pressure respectively. A valve 104 is connected across valves 90,92 for manual bypass. Each of the flow lines 84,86,88 is identical to line 80 hereinabove discussed, with corresponding elements being indicated by correspondingly identical reference numerals. The flow lines 82,84,86,88 are separately connected to a manifold 130 for individual connection of the flow lines to hose 38, and thence to Kelly bar 18.

Microprocessor 102 receives a first input from a sensor 104 coupled to Kelly bar 18 for sensing angular velocity of the Kelly bar and drill bit, and feeding a corresponding electrical signal to the microprocessor as a function of such angular velocity. Likewise, a second sensor 106 is coupled to the Kelly bar for sensing axial velocity of the Kelly bar and drill bit into and out of the earth's surface, and providing a corresponding electrical signal to the microprocessor. An operator keyboard 108 is provided for operator input of control parameters. Microprocessor 102 is also coupled to a panel 110 of digital readouts (FIG. 8), and to a twelve-channel chart recorder 112 for recording flow, temperature and pressure fluctuations in each of the four lines 82-86, as well as recording time along the edge of the chart.

Figure 8:
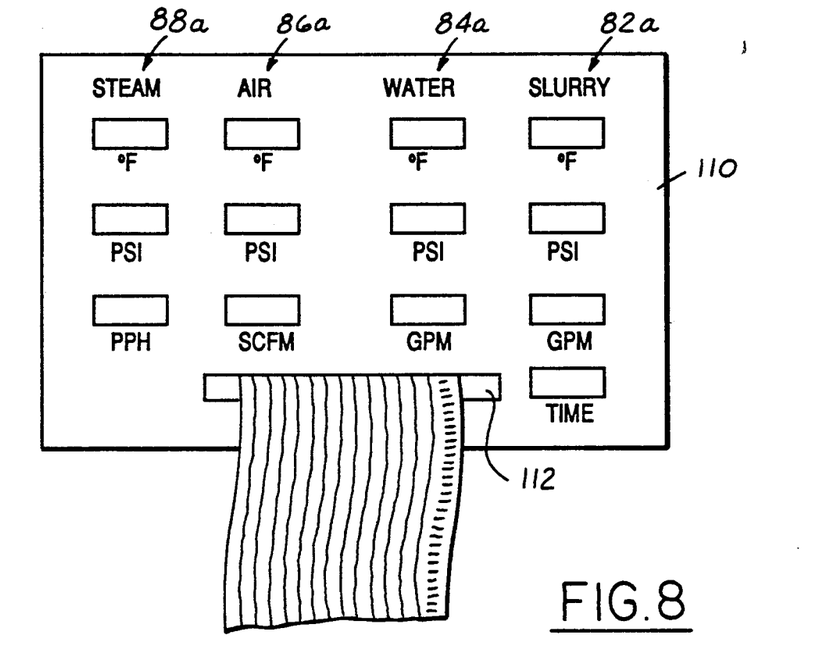
FIG. 8 is a front elevational view of the fluid control system operator panel.

FIG. 8 illustrates operator digital readout panel 110 and chart recorder 112. The four fluid lines 82-88 in FIG. 7 have corresponding display columns 82a-88a in panel 110. Each display column has a corresponding digital display for indicating fluid temperature in °F., fluid pressure in psi, and fluid flow rate in gallons per minute for slurry and water, standard cubic feet per minute for compressed air and pounds per hour for steam. By way of example, the slurry and water flows may be selectively fed to the Kelly bar at up to 1,000 gallons per minute at 300 psi and 212° F. Air may be fed to the Kelly bar at up to 1500 cubic feet per minute, 200 psi and 300° F., while steam may be fed to the Kelly bar at up to 10,350 pounds per hour, 250 psi and 400° F. All of these parameters may be selectively varied by the operator.

In operation, and in accordance with the second aspect of the present invention hereinabove summarized, microprocessor 102 is thus responsive to either or both of the velocity sensors 104,106 to control fluid supplied to the Kelly bar through selective operation of the various control valves 94. For example, the operator may program microprocessor 102 through keyboard 108 to supply grout (cement/flyash/water) slurry through line 82 so as to deposit one hundred pounds of grout slurry per cubic feet of earth as the Kelly bar and drill bit are rotated and removed from the earth (by cable 20). In this connection, it will be noted that non-uniform spacing of nozzles orifices 74 radially outwardly of the drill bit blades, as hereinabove described, automatically compensates for increased distance of travel toward the outer edges of the blades, while injecting the fluid into the earth substantially uniformly. It will also be appreciated that one or more of the fluids could be injected into the earth as the drill bit penetrates the earth. For example, injection of air through line 88 may assist drill penetration in extremely dense earth or clay.

Figure 9:
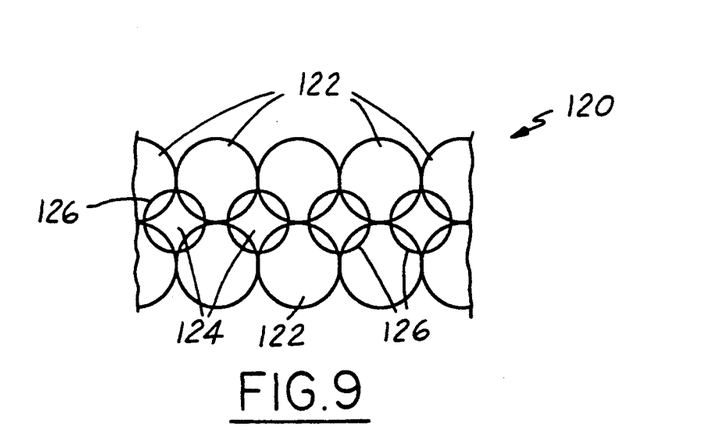
FIG. 9 is a schematic diagram of a drill pattern for in-situ soil treatment in accordance with one preferred implementation of the present invention.

FIG. 9 illustrates a drilling pattern 120 that may be implemented using the apparatus of the invention. For example, substantially cylindrical holes 122 may be drilled in succession in parallel laterally adjacent rows. The drill bit may then be changed to a drill of smaller diameter, and the rosebuds 124 between holes 122 may be covered by a succession of interstitial holes 126. In this connection, it will be appreciated that the drill bit 30 of the present invention may be provided in diameters up to twelve feet, as contrasted with three foot diameters in drills or augers heretofore proposed. Thus, an entire field of contaminated soil may be covered much more efficiently and effectively with the apparatus of the present invention.

Figure 10:
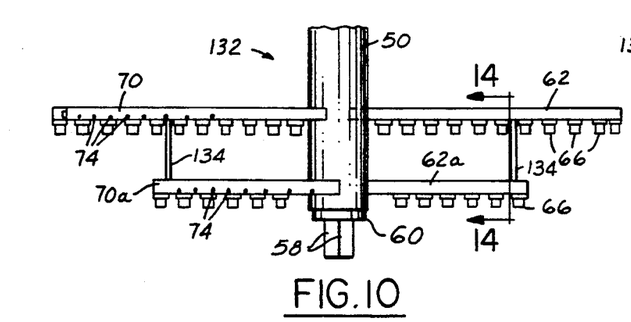
FIGS. 10-13 are views of modified drill bits for implementation of various aspects of the invention.
Figure 13:
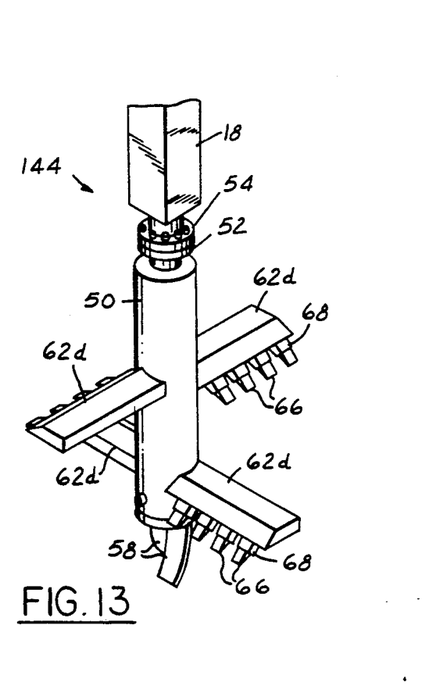
Figure 14:
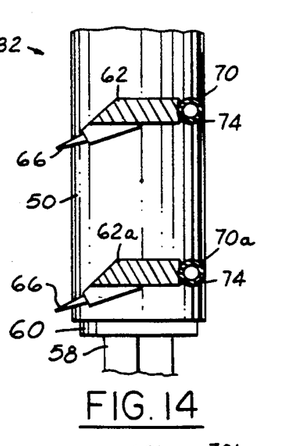
FIGS. 14-15 are sectional views taken substantially along the lines 14—14 and 15—15 in FIGS. 10 and 11 respectively.

FIGS. 10-15 illustrate modified drill bits for implementing various aspects of the invention. Elements identical to those discussed hereinabove are identified by correspondingly identical reference numerals, and similar elements are distinguishable by a letter suffix. FIGS. 10 and 14 illustrate a modified drill bit 132 in which a second pair of blades 62a are affixed to and extend diametrically outwardly from the lower end of sleeve 50 adjacent to teeth 58. Blades 62a are positioned beneath blades 62, being of lesser radial dimension, and the outer ends of blades 62a are supported beneath blades 62 by vertical braces 134. The nozzle orifices 74 in drill bit 132 are of uniform spacing radially of sleeve 50, and are angulated downwardly rather than upwardly with respect to the planes of blades 62,62a. Such downward angulation of the orifices reduces the need for a deflector 76 (FIGS. 4-6).

Figure 11:
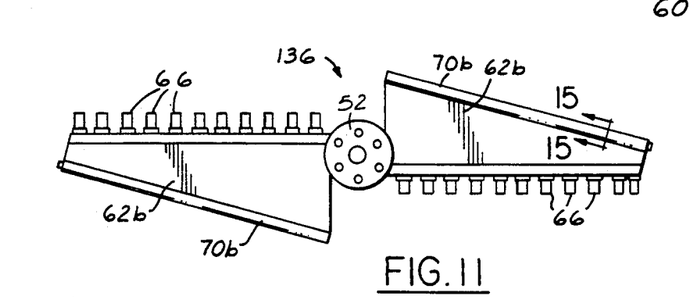
Figure 12:
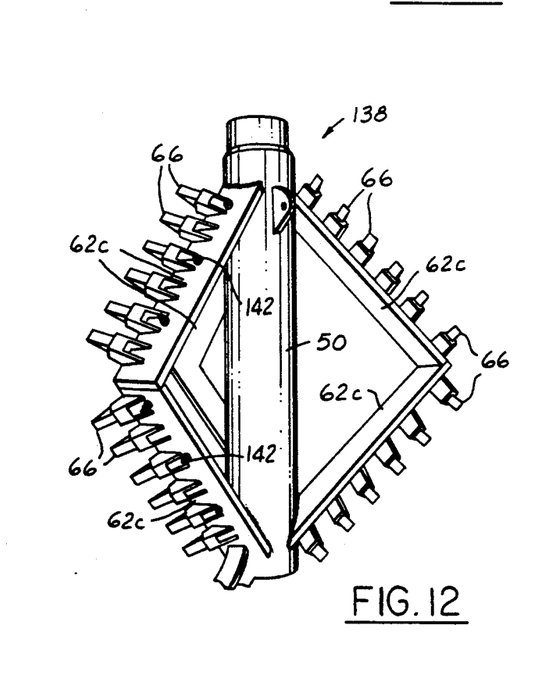
Figure 15:
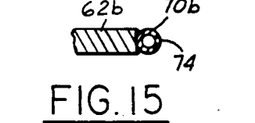

FIGS. 11 and 15 illustrate another drill bit configuration 136 in which the blades 62b are cantilevered from sleeve 50 at an upward angle with respect to the sleeve axis, rather than perpendicular thereto as in blades 30,132. Orifices 74 in the embodiment of FIG. 11 open tangentially of the sleeve axis, and are not angulated either upwardly or downwardly as in the preceding embodiments. In the modified drill bit 138 illustrated of FIG. 12, the blades 62c are positioned in three circumferentially spaced pairs that extend at an angle from sleeve 50 and are welded to each other at the sleeve-remote ends. Teeth 66 extend forwardly from each blade 62c, being angulated downwardly on the lower blade of each pair and angulated upwardly on the upper blade of each pair. Nozzles 142 take the form of fittings positioned behind alternate teeth 66 on each blade 62c, the blades being hollow and communicating with the interior of sleeve 50. It will be noted that nozzle fittings 142 are positioned behind differing teeth in the upper and lower blades of each pair—i.e., behind the first, third and fifth teeth of the lower blade, and the second, fourth and sixth teeth of the upper blade. Drill bit 138 illustrated in FIG. 12 it is particularly useful for drilling through sludge and muck at the bottom of a river or pond. The drill bit 144 of FIG. 13 is similar to bit 30 of FIGS. 1–6, with the exception that the blades 62d are of lesser radial dimension and are provided in circumferentially staggered pairs spaced from each other axially of sleeve 50. Preferably, the pairs are at 90° spacing, as shown in the drawing. Pipes 70, orifices 74 and deflectors 76 are provided, but are not shown in FIG. 13 for purposes of clarity.

We claim:

1. Apparatus for in-situ treatment of contaminated soil that includes: an elongated hollow drive shaft, means for rotating said shaft about its axis while supporting said shaft in desired orientation, means coupled to said shaft for selectively injecting fluid under pressure into said shaft, and drill means affixed to a lower end of said shaft for drilling a hole downwardly through soil; characterized in that said drill means comprises:
   a hollow sleeve mounted to said lower end of said shaft and extending therefrom coaxially with said shaft,
   a pair of drill blades cantilevered from said sleeve and extending radially outwardly therefrom diametrically opposite each other, said blades being of solid construction and identical uniform cross section and length,
   a plurality of radially spaced drill teeth oriented tangentially of said sleeve along one radial edge of each said blade, said teeth being angulated downwardly with respect to said sleeve,
   a hollow pipe affixed to each said blade extending along a radial edge of said blade opposite said one edge, each said pipe opening into said sleeve for receiving fluid from said sleeve and said shaft, and
   a plurality of nozzles consisting of radially spaced openings in each said pipe oriented tangentially of said sleeve oppositely of said teeth.

2. The apparatus set forth in claim 1 wherein said pluralities of openings are identically oriented and positioned on each said pipe.

3. The apparatus set forth in claim 1 wherein said openings are oriented at a 45° angle to said axis.

4. The apparatus set forth in claim 1 wherein said openings are positioned at non-uniform radial spacing on each said pipe.

5. The apparatus set forth in claim 4 wherein said openings are spaced from each other by decreasing distances radially outwardly of each said pipe.

6. The apparatus set forth in claim 1 further comprising a second pair of drill blades cantilevered from said sleeve and extending radially outwardly therefrom diametrically opposite each other, said second pair of blades being of solid construction and identical uniform cross section and length and spaced from said first pair axially of said sleeve.

7. The apparatus set forth in claim 6 wherein said second pair of blades are staggered from said first pair circumferentially of said sleeve.

8. The apparatus set forth in claim 6 wherein said second pair of blades are axially aligned with said first pair.

9. The apparatus set forth in claim 6 wherein all of said blades are identical.

10. The apparatus set forth in claim 1 wherein said drill means further comprises deflector means carried by each said blade adjacent to said opposite edge for deflecting soil from said openings during rotation of said drill means.

11. The apparatus set forth in claim 10 wherein said nozzle openings are oriented at an upward acute angle to said axis, and wherein said deflector means comprise a pair of plates affixed to said blades and extending along each said opposite edge at an upward angle over said openings.

12. Apparatus for in-situ treatment of contaminated soil that includes: an elongated hollow drive shaft, means for rotating said shaft about its axis while supporting said shaft in desired orientation, means coupled to said shaft for selectively injecting fluid under pressure into said shaft, drill means affixed to a lower end of said shaft for drilling a hole downwardly through the soil, and nozzle means on said drill means coupled to said shaft for injecting fluid from said shaft into the soil; characterized in that said fluid-injecting means comprises:
    first sensing means coupled to said shaft for providing a first electrical signal as a function of velocity of said shaft,
    valve means responsive to an electronic control signal for controlling flow of fluid to said shaft, and
    electronic control means responsive to said first electrical signal for providing said control signal so as to control injection of fluid into said drive shaft as a predetermined function of velocity of said shaft so as to achieve substantially uniform injection per unit of volume of drilled soil.

13. The apparatus set forth in claim 12 further comprising means responsive to an operator for selectively varying said predetermined function.

14. The apparatus set forth in claim 12 wherein said first sensing means comprises means responsive to axial velocity of said shaft.

15. The apparatus set forth in claim 12 wherein said first sensing means comprises means responsive to angular velocity of said shaft.

16. The apparatus set forth in claim 12 further comprising second sensing means coupled to said fluid-injecting means and responsive to a preselected characteristic of the fluid for providing a second electrical signal, and wherein said electronic control means comprises means for providing said control signal as a combined function of said first and second electrical signals.

17. The apparatus set forth in claim 16 wherein said preselected characteristic is selected from the group consisting of temperature, pressure and flow rate of said fluid.

18. A method for in-situ treatment of contaminated soil that includes the steps of: (a) rotating a drill bit about its axis into the soil, and (b) injecting soil treatment fluid into the soil through the drill bit as the drill bit is rotating; characterized in that said step (b) comprises the steps of:
    (c) measuring axial velocity of said drill bit within the soil, and
    (d) controlling rate of fluid injection as a function of such axial velocity so as to achieve substantially uniform fluid injection per unit volume of drilled soil.

19. The method set forth in claim 18 wherein said step (c) comprises the additional step of measuring angular velocity of said drill bit, and wherein said step (d) comprises the step of controlling rate of fluid injection as a combined function of angular and axial velocities.

20. The method set forth in claim 18 comprising the additional step of: (e) withdrawing said drill bit from the soil while continuing rotation thereof, and wherein said step (d) comprises the step of controlling injection of fluid during said step (e) as a function of drill bit axial velocity.

21. Apparatus for in-situ treatment of contaminated soil that includes: an elongated hollow drive shaft, means for rotating said shaft about its axis while supporting said shaft in desired orientation, means coupled to said shaft for selectively injecting fluid under pressure into said shaft, and drill means affixed to a lower end of said shaft for drilling a hole downwardly through soil; characterized in that said drill means comprises:

- a hollow sleeve mounted to said lower end of said shaft and extending therefrom coaxially with said shaft,
- a pair of drill blades cantilevered from said sleeve and extending radially outwardly therefrom diametrically opposite each other, said blades being of identical uniform cross-section and length,
- a plurality of radially spaced drill teeth oriented tangentially of said sleeve along one radial edge of each said blade, said teeth being angulated downwardly with respect to said sleeve,
- a hollow pipe on each said blade extending along a radial edge of said blade opposite said one edge, each said pipe opening into said sleeve for receiving fluid from said sleeve and said shaft, and
- a plurality of nozzle means on each said pipe opening tangentially of said sleeve oppositely of said teeth, said pluralities of nozzle means being identically oriented and positioned on each said pipe, said nozzle means being positioned at non-uniform radial spacing on each said pipe spaced from each other by decreasing distances radially outwardly of each said pipe.

22. The apparatus set forth in claim 21 wherein said nozzle means are oriented at an acute angle to said axis.

23. The apparatus set forth in claim 21 wherein said drill blades are affixed to said sleeve at opposite right angles to said sleeve.

24. The apparatus set forth in claim 23 wherein said blades are diametrically aligned with each other.

25. The apparatus set forth in claim 24 wherein said drill means further comprises a pair of axially angulated teeth extending from a lower end of said sleeve.

26. The apparatus set forth in claim 21 wherein said drill teeth are radially uniformaly spaced along each said blade.

27. The apparatus set forth in claim 21 further characterized in that said means for selectively injecting fluid under pressure comprises: means responsive to velocity of said drill means, and means coupled to said velocity-responsive means for controlling injection of fluid as a function of velocity of said drill means.

28. The apparatus set forth in claim 27 wherein said injection-controlling means comprises means responsive to axial velocity of said drive shaft for controlling rate of injection of fluid as a function of axial velocity of said drive shaft.

29. The apparatus set forth in claim 28 further comprising means for withdrawing said drive shaft and said drill means from the soil, and wherein said injection-controlling means comprises means responsive to axial velocity of said drive shaft during such withdrawal for controlling rate of injection of fluid as a function of axial velocity of said drive shaft.

30. The apparatus set forth in claim 27 wherein said injection-controlling means further comprises means responsive to angular velocity of said drill means for controlling rate of injection of fluid as a function of angular velocity of said drill means.

* * * * *